UNITED STATES PATENT OFFICE.

OTTO ZIUREK, OF BERLIN, GERMANY, ASSIGNOR TO OTTO BERNHARD EMANUEL HILLER, OF SAME PLACE.

WATER-PROOF COMPOSITION FOR FELT, PAPER, &c.

SPECIFICATION forming part of Letters Patent No. 323,016, dated July 28, 1885.

Application filed February 7, 1885. (No specimens.)

*To all whom it may concern:*

Be it known that I, OTTO ZIUREK, a subject of the King of Prussia, a resident of the city of Berlin, Kingdom of Prussia, German Empire, have invented new and useful Improvements to Make Water-Proof Woven or Felted Manufactures, also Paper, Peat-Board, and similar articles, of which the following is a specification.

The attempts hitherto made for producing water-proof fabrics by impregnating the same with aluminous salts have had but little practical success, the reason for which may be found in that insufficient attention has been paid to the presence of other salts, and, on the other hand, when the ordinary sizes are used (such as starch, gum-dextrine) or glutinous vegetable extracts have been added (carrageen, "sem. psyllii") and the like, the basic aluminous salt that was formed could not be permanently fixed upon the fiber. All these additions remain soluble in water, even after drying, and under the renewed influence of water, say, by rain, are dissolved and washed away, so that when the fabric is afterward bent, folded, beaten, or in general used, the aluminous salt is mechanically detached and removed.

The process hereinafter described differs from all the methods hitherto known, inasmuch as such an adhesive is used for fixing the aluminous salt upon the fibers of the impregnated fabric as will on being dried not again become soluble in water, and consequently retains the aluminous salt. This adhesive is found in albumen, whatever its origin, whether obtained from eggs or from blood. The impregnating-liquid should, moreover, contain the chemicals in as pure a state (chemically) as possible, and it is advantageous to manufacture them as follows: For each liter of the liquid to be prepared take eighty grains of best subsulphate of alumina (schwefelsaure thonerde) dissolved in two hundred grams of water, and to this solution four hundred and seventy grains of acetate of lead, (blussig,) specific gravity 1.22 are added under constant stirring. As, however, the subsulphate of alumina always varies to some extent in its composition, it will be required to take a sample of the liquid after the precipitate which is formed has settled, and this sample tested by known means for the presence of a slight excess of subsulphate of alumina. An excess is requisite to insure that all the basic acetate of lead-oxide (basisch essigsaures bleioxid) is decomposed. On the other hand the excess should be as slight as possible and not be more than one-half per cent. The above-mentioned clear solution is then separated from the precipitate by filtration, and its bulk is brought up by subsequent washings to one liter. To this add with constant stirring a solution of, say, twelve to fifteen grains of albumen for sixty grams of water. Should flocculency occur in this manipulation the liquid is again strained. With this liquid the materials to be rendered water-proof are saturated or impregnated, then dried either in the atmosphere or, by preference, in a drying-room, and finally rolled between hot rollers so as completely to coagulate the albumen of the impregnating liquid.

For the success of this process it is absolutely required that the albumen be completely coagulated, and thus rendered insoluble in water.

The essential part of the above-described apparatus is based upon the employment of a neutral or nearly neutral solution of acetate of alumina (essigsaure thonerde) as free as possible from other salts, and the employment of albumen as a fixing medium for the aluminous salt.

The described manufacture of the acetate of alumina solution is an essential condition for the success of the process, for any excess of one or the other salt or the presence of other salts would prevent the effect of the entire solution, and for this reason alum cannot be used instead of the subsulphate of alumina nor sugar of lead for the acetate of lead.

If in manufacturing the impregnating-liquid sugar of lead were used instead of lead-acetate, the solution that is obtained would be too acid and attack the color of the fabric to be prepared by coagulation of the albumen.

It will be readily understood that textile fabrics, plaiting-felt, and paper made from fibrous material can be water-proofed; but great care must be taken that the rollers or plates between which the fabric or material is passed may be hot enough perfectly to coagulate the albumen, which effect may, however, be produced by any other means.

I claim—

The herein-described waterproofing composition, composed of a solution of acetate of alumina, acetate of lead, and albumen in or about in the proportions set forth.

In testimony whereof I have hereunto set my hand in the presence of two subscribing witnesses.

OTTO ZIUREK.

Witnesses:
 ALEN SCHOLZE,
 B. ROI.